(12) United States Patent
Barlet-Gouedard et al.

(10) Patent No.: US 6,911,078 B2
(45) Date of Patent: Jun. 28, 2005

(54) CEMENTING COMPOSITION AND APPLICATION OF SUCH COMPOSITIONS FOR CEMENTING OIL WELLS OR THE LIKE

(75) Inventors: Véronique Barlet-Gouedard, Chatenay Malabry (FR); Bruno Goffe, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 117 days.

(21) Appl. No.: 10/239,459

(22) PCT Filed: Mar. 21, 2001

(86) PCT No.: PCT/EP01/03275
§ 371 (c)(1),
(2), (4) Date: Feb. 6, 2003

(87) PCT Pub. No.: WO01/70646
PCT Pub. Date: Sep. 27, 2001

(65) Prior Publication Data
US 2004/0211341 A1 Oct. 28, 2004

(30) Foreign Application Priority Data
Mar. 23, 2000 (FR) .............................................. 00 03996

(51) Int. Cl.$^7$ ................................................. C04B 7/02
(52) U.S. Cl. ....................... 106/692; 106/713; 106/737; 106/738
(58) Field of Search .............................. 106/692, 713, 106/737, 738

(56) References Cited
U.S. PATENT DOCUMENTS
3,860,433 A * 1/1975 Ost et al. ..................... 106/765
* cited by examiner Primary Examiner—Paul Marcantoni
(74) Attorney, Agent, or Firm—Thomas O. Mitchell; Robin Nava; Brigitte L. Echols

(57) ABSTRACT

The present invention concerns cementing compositions for an oil well or the like, based on a Portland cement, silica and alumina, wherein the mineralogical composition of the cement matrix is included in the Si—Ca—Al triangle in one of the margarite-haüyne-[epidote/pumpellyite], haüyne-prehnite-[epidote/pumpellyite] and haüyne-prehnite-pectolite composition triangles. More particularly, the cementing compositions of the invention are suitable for cementing wells subjected to high temperatures and to chemical attack by brines, and are more suitable when the brine—or a saline formulation close to that of the brine—is used as the mixing water.

13 Claims, 2 Drawing Sheets

Figure 1:
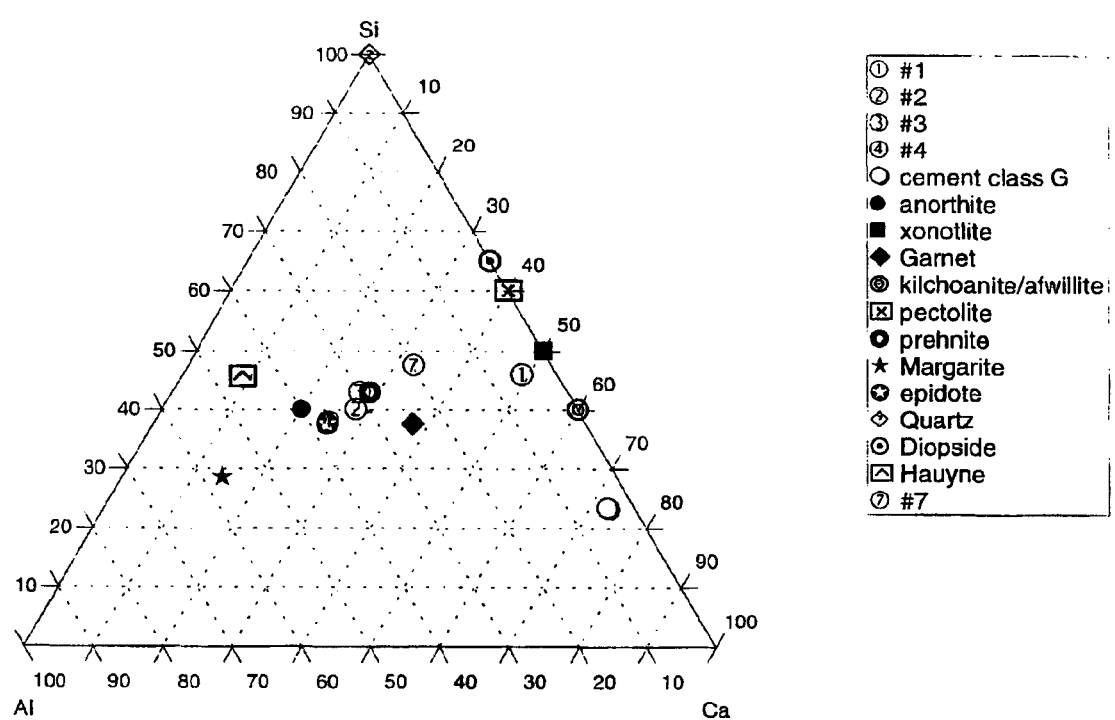

CEMENTING COMPOSITION AND APPLICATION OF SUCH COMPOSITIONS FOR CEMENTING OIL WELLS OR THE LIKE

The present invention relates to techniques for drilling oil, gas, water or geothermal wells or the like. More precisely, the invention relates to cementing compositions, more particularly suitable for high temperature wells such as geothermal wells, very deep wells or more generally, wells subjected to thermal and/or chemical attack, in particular as regards injecting steam to stimulate production or due to the presence of brine.

After drilling an oil well or the like, a casing or a coiled tubing is lowered into the hole and cemented over all or part of its depth. In particular, cementing prevents exchange of fluids between the different layers of formation traversed by the hole, prevents gas from rising in the annular space surrounding the casing or limits the ingress of water into the production well. Its principal purpose, of course, is to support the casing.

In the vast majority of cases, a Portland cement is used as the hydraulic binder, a material which is essentially constituted by calcium silicates and calcium aluminosilicates. In the presence of water, those mineral phases hydrate and preferentially form hydrated calcium silicate (CSH) and also portlandite ($Ca(OH)_2$) and aluminium sulphate. CSH is a gel which is largely responsible for the cohesion and mechanical strength of the cement in the short to medium term.

When the temperature exceeds about 100° C., in the first days or months the majority of cements lose compressive strength and become permeable. Then they regain their strength and their permeability reduces. That phenomenon, known as retrogression, is due to metamorphosis of CSH gel to a highly crystalline phase known as alpha dicalcium silicate, $\alpha$-$C_2SH$, which is much more dense than CSH with a contraction in volume and an increase in the porosity of the cement. This results in disintegration of the cement which increases in rate as the porosity increases, rendering it more sensitive to chemical attack such as channelling of brine or circulation of carbon dioxide.

To avoid the phenomenon of retrogression, silica in the form of sand or silica flour is systematically added to compositions which have to withstand temperatures of more than 100° C. Adding 35% to 40% of silica (with respect to the weight of the Portland cement) brings the $CaO/SiO_2$ ratio (usually denoted C/S) to about 1.

Under those conditions, CSH then transforms at about 110° C. to tobermorite $C_5S_6H_5$ then to xonotlite $C_6S_6H$ if the temperature is raised to 150° C. Those phases ensure the stability of the cement at high temperature, in the absence of brine. Those two minerals are in themselves very strong but they have slightly different apparent densities, which destabilises the cement Further, near 250° C., a new mineralogical phase, truscottite ($C_7S_{12}H_3$) forms which further embrittles the cement and increases its permeability. The degradation mechanisms described above are certainly not exhaustive, not least because the roles of other oxides present in the Portland cement, in particular alumina and ferrites, have been ignored, but they suffice to demonstrate the complexity of the phenomena occurring, without even considering the reaction products between the cement matrix and brines. In nature, in a geological medium, cement is thus metastable. In contact with brine, its mineralogical repertoire is modified by ion exchanges, which modify its physical qualities.

The problems of cement disintegration when the temperature is raised are more severe when developing very deep wells, or injecting steam to recover highly viscous oils, or in geothermal wells to exploit geothermal energy.

French patent FR-A-2 765 571 proposes selecting a mineralogical phase which is stable at the envisaged temperatures and pressures and promoting its formation by adding a certain quantity of a mineral oxide to a base constituted by Portland cement and silica. In particular, that patent describes compositions which can promote the formation of calcium hydrogarnets from the series [$SiO_4$]$Ca_3$ $M^{3+}$, where M=Al (grossularite) or M=Fe (andradite) by adding alumina or ferrite. The quantity added is typically in the range 20% to 50% (by weight with respect to the weight of Portland cement), i.e., of the same order of magnitude as the amount of silica added. A more particularly preferred composition is constituted by class G Portland cement, 30% to 40% of silica (preferably of the order of 35%) and 20% to 40% of alumina (preferably of the order of 30%).

The mineral phases favoured by these compositions are principally of varying composition, in particular hydrogarnets from the hydrogrossularite series, with a structure derived from calcium garnets $Ca_3Al_2Si_3O_{12}$ ($C_3AS_3$) with the silica atoms omitted and replacement of the oxygen atoms to which they were bonded by hydroxyl groups. When all of the silicon atoms are replaced, $C_3AH_6$ is obtained. Under the selected experimental conditions (288° C., 20 MPa), those garnets have unfortunately been shown to be poorly constituted in part, with low reproductivity of crystallisation leading to larger or smaller crystals associated with high heterogeneity in compression test results.

The aim of the invention is to develop novel formulations suitable for cementing oil, gas, geothermal wells or the like, based on a Portland and alumina type cement tending to form mineral phases such that the properties of the cement matrix, in particular regarding compressive strength, do not degrade in practice under the effect of a rise in temperature and pressure (250° C.–300° C.; 20 MPa) and/or chemical attack (brines).

The invention thus provides a cement matrix included in the Si—Ca—Al triangle in one of the margarite-haüyne-[epidote/pumpellyite], haüyne-prehnite- [epidote/pumpellyite] and haüyne-prehnite-pectolite composition triangles. In the Si—Al—Ca—Na system, there exist in the triangles defined many mineral phases which are stable under the temperatures and pressures under consideration.

Preferably again, the compositions of the invention are located in the most calcium-rich zones, in particular close to the margarite-[epidote/pumpellyite]-pectolite junctions and margarite-prehnite-pectolite junctions, corresponding to compositions within the Si—Ca—Al triangle approximately in the zone delimited by silica between 35% and 50%, aluminium between 20% and 38% and calcium between 25% and 35%.

Such mineral compositions are obtained, for example, by adding, to a Portland cement, a silica (typically 75% to 85% by weight with respect to the weight of class G Portland cement) and alumina (in the range 30% to 80% by weight with respect to the weight of class G Portland cement). Preferably, all or part of the added silica is in the form of micro-silica, i.e., in a highly reactive form. The presence of a high reactivity phase in the formulation appears to encourage aluminosilicate crystallisation reactions during the first hours of setting, subsequently limiting competition between the kinetics of the dissolution of low or poor crystallinity initial phases and the kinetics of aluminosilicate crystallisation.

The degradation kinetics in brine of the compositions of the invention are much slower than that of ordinary oil-well cements. Further, the presence of a brine during setting, or even deliberately introduced into the mixing water, is not a factor in rapid cement degradation. In contrast, the presence of sulphate on setting of the cement can encourage the formation of calco-sodium crystals which are particularly stable under the envisaged conditions.

Figure 2:
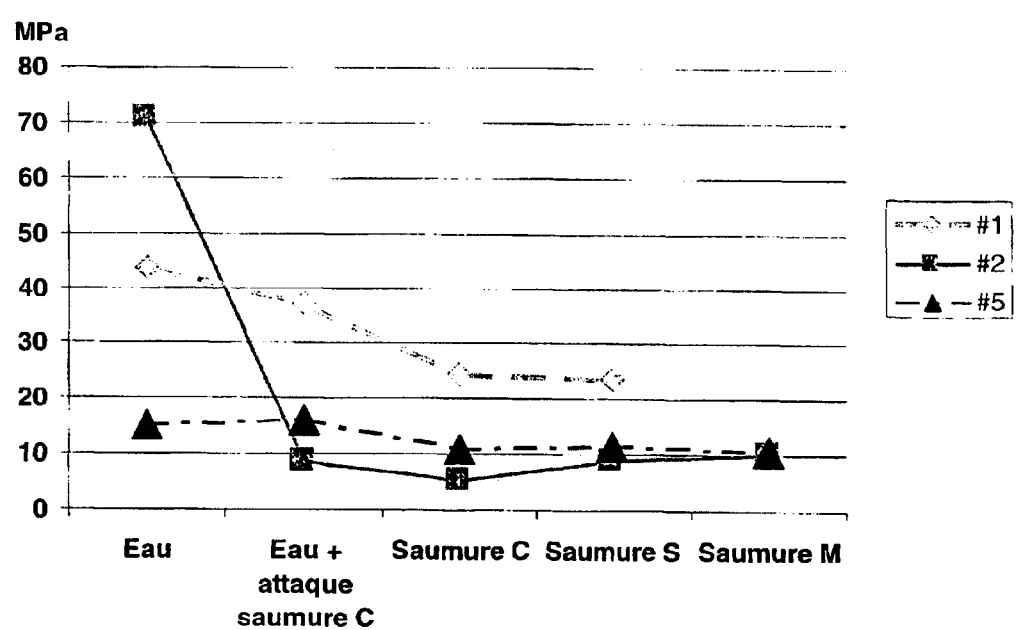

Further advantageous details and characteristics of the invention will become apparent from the description below of tests established for different examples of additive compositions, made with reference to the figures which show:

FIG. 1: a phase diagram of a ternary silica/aluminium/calcium system;

FIG. 2: a graph showing the evolution of compressive strength after high temperature treatment in the presence of brine for different cement compositions.

The studies reported in French patent application FR-A-2 765 271 tended to promote mineral phases such as hydrogarnets from the hydrogrossularite series, $C_3AH_6$, by modifying the composition of a hydraulic binder based on a Portland cement by adding a certain quantity of alumina However, while various garnets are effectively formed under the selected experimental conditions (288° C., 20 MPa), it has been observed that these garnets were quite poorly constituted and of low durability and further, xonotlite persists in forming. Xonotlite embrittles cement by forming cavities inside the structure; further, this phenomenon is aggravated in the presence of brine by dissolution of xonotlite.

In order to better appreciate the adaptation possibilities of the system, FIG. 1 shows the mineral phases of the Si—Al—Ca—Na system, summarised in Table I below and projected on the ternary Si—Al—Ca diagram. Clearly there exist many junctions between minerals which theoretically allow the xonotlite to disappear while avoiding the formation of garnets which have been proved to be unstable.

The domains defined by the margarite-haüyne-[epidote/pumpellyite], haüyne-prehnite- [epidote/pumpellyite] and haüyne-prehnite-pectolite junctions are susceptible of being described by a large number of mineral phases which are stable under the temperature and pressure conditions under consideration and close to the compositions of the natural basic rocks which are generally within the margarite-quartz-diopside triangle.

Knowing that the composition of the oxides of the Portland cement is as given in Table 2 (weight %):

TABLE 2

| CaO | $SiO_2$ | $Fe_2O_3$ | $Al_2O_3$ | $SO_3$ | MgO | $Na_2O$ | $K_2O$ |
|------|------|------|------|------|------|------|------|
| 64.2 | 19.4 | 5.5 | 4.5 | 2.8 | 2.0 | 0.1 | 0.6 |

The composition has to be enriched with alumina and silica to place it into these favourable regions. However, the composition has to be able to be prepared with a quantity of mixing water such that the density of the slurry is of the order of the densities usually used for cementing an oil well or the like and the slurry must have rheological properties of the slurry must be compatible with pumping in such a well.

Six slurries with a density of 1.95 g/cm$^3$ and one of 1.49 g/cm$^3$ were thus prepared based on class G Portland cement (Black label). The formulations are shown in Table 3 below. For the liquid constituents (fluid loss control agents and antifoaming agent), the quantities are indicated in gallons per sack of Portland cement (1 gps=3.78 litres per 94 pound cement sack, i.e., 1 gps=0.070 litres per kilogram of Portland cement). For all of the other constituents (the solid constituents) the quantities are given as the percentages by weight with respect to the weight of Portland cement (BWOC=by weight of cement).

All of the proposed formulations were optimised to obtain a slurry with a rheology compatible with pumping in a subterranean well, which necessitates adding dispersing agents.

Composition #1 was a prior art oil-well cement composition intended for high temperature wells, containing 35% silica The other compositions were compositions of the invention comprising 30% to 80% of micro-alumina and 75% to 85% of silica in the form of a mixture of silica with a grain size close to the grain size of a Portland cement (average particle size close to 20 μm for silica and 14 μm for cement) and micro-silica (average particle size close to 1.2 μm). For composition 7, silica and alumina are also present in the form of silica/alumina microspheres having a diameter of about 100 μm.

TABLE 1

| Classes | Structural forms | Classes | Structural forms |
|---------|------------------|---------|------------------|
| Plagioclase: | Albite [$Si_3AlO_8$]Na | Zeolite: | Analcime [$Si_2AlO_6$]($Na_2$,Ca)$2H_2O$ |
| | Anorthite [$Si_2Al_2O_8$]Ca | | Gismondine [$Si_2Al_2O_8$]Ca$4H_2O$ |
| Feldspathoid: | Cancrinite [$SiAlO_4$]$_3CO_3Na_3$Ca | | Heulandite ($Si_7Al_2O_{18}$)Ca$6H_2O$ |
| | Haüyne [$SiAlO_4$]$_6(SO_4,S)_{1-2}$(Na,Ca)$_{4-8}$ | | Laumontite [$Si_2AlO_6$]Ca$_4H_2O$ |
| | Noselite [$SiAlO_4$]$_6SO_4Na_8$ | | Pectolite [$SiO_3$]$_3NaCa_2$H |
| | Sodalite [$SiAlO_4$]$_6Cl_2Na_8$ | | |
| Micas: | Margarite [$SiAlO_5$]$_2$(OH)$_2CaAl_2$ | | Prehnite [$Si_3AlO_{10}$]Ca$_2$Al(OH)$_2$ |
| Epidote: | Zoisite[$SiO_7$][$SiO_4$](OH)Al$_2$OCaAl$_2$ | | Wairakite [$Si2AlO6$]$2Ca2H_2O$ |
| Pumpellyite: | [[$Si_2O_7$][$SiO_4$]$_2$(OH)$_3$O(Al,Fe$^{3+}$)$_5$(Mg,Fe$^{2+}$)Ca$_4$2H$_2$O | Scapolite: | Marialite [$Si_3AlO_8$]$_3$ClNa$_4$ |
| Garnet: | Grossularite [$SiO_4$]$_3Al_2Ca_3$ | | Meionite [$SiAlO_4$]$_6CO_3Ca_4$ |

TABLE 3

| | # | | | | | | |
|---|---|---|---|---|---|---|---|
| | 1 | 2 | 3 | 4 | 5 | 6 | 7 |
| Micro-alumina | — | 70 | 60 | 80 | 70 | 60 | 14 |
| Silica | 35 | 55 | 55 | 55 | 85 | 85 | — |
| Micro-silica | — | 30 | 30 | 30 | — | — | 52 |
| Silica/alumina microspheres | — | — | — | — | — | — | 44 |

TABLE 3-continued

| | # | | | | | | |
|---|---|---|---|---|---|---|---|
| | 1 | 2 | 3 | 4 | 5 | 6 | 7 |
| Dispersing agent | 0.3 | 0.8 | 0.8 | 0.8 | 0.8 | 0.8 | 0.03 |
| Retarder 1 | 0.3 | 0.5 | 0.45 | 0.55 | 0.9 | 0.9 | 0.44 |
| Retarder 2 | 0.15 | 0.3 | 0.25 | 0.33 | 0.5 | 0.5 | 0.26 |
| Fluid loss control agent | 0.6 | 0.6 | 0.6 | 0.6 | 0.6 | 0.6 | 2.5 |
| Antifoaming agent | 0.05 | 0.05 | 0.05 | 0.05 | 0.05 | 0.05 | 0.03 |

The relative amounts of silicon, aluminium and calcium in these different formulations are as follows:

TABLE 4

| | # | | | | |
|---|---|---|---|---|---|
| | 1 | 2 or 5 | 3 or 6 | 4 | 7 |
| Silicon | 46% | 40% | 43% | 38% | 48% |
| Aluminium | 5% | 32% | 30% | 37% | 20% |
| Calcium | 49% | 28% | 27% | 25% | 33% |

Table 5 shows the results obtained regarding the rheology of the slurry, assuming the fluid to be a Bingham fluid (plastic viscosity and yield stress Ty). The measurements were carried out under the conditions recommended by the API (American Petroleum Institute), at ambient temperature representing the nature of the surface during mixing of the cement, and at a temperature of 149° C. (300° F.), representing the temperature of a cement slurry circulating at the bottom of an oil well. The gel strength was measured after leaving the slurry to stand for 10 minutes following stirring for 1 minute.

The values shown in Table II indicate that the compositions were well suited to cementing an oil well or the like.

TABLE 5

| | Rheology after mixing at ambient temperature | | Rheology at bottom hole circulation temperature (145° C.) | | |
|---|---|---|---|---|---|
| | PV cP or mPa·s | Ty lbf/100 ft² (Pa) | PV cP or mPa·s | Ty lbf/ 100 ft² (Pa) | Gel strength lbf/ 100 ft² (Pa) |
| 1 | 602 | 13 (6.2) | 196 | 4 (1.9) | 12 (5.7) |
| 2 | 53 | 21 (10.1) | 30 | 15 (7.2) | 36/19 (17/9) |
| 3 | 58 | 21 (10.1) | 36 | 13 (6.2) | 33/15 (16/7) |
| 4 | 48 | 21 (10.1) | 28 | 15 (7.2) | 35/17 (17/8) |
| 5 | 55 | 16 (7.7) | 26 | 11 (5.3) | 22/10 (10/5) |
| 6 | 63 | 17 (8.1) | 29 | 12 (5.8) | 24/11 (11/5) |
| 7 | 257 | 29 (14) | 109 | 3 (1.45) | 21/6 (10/3) |

Table 6 below summarises the characteristic cement setting data and the compressive strengths measured after 24 hours setting. With the exception of the free water volume measurement, carried out at laboratory temperature, all of the measurements were made at 149° C. (300° F.). The pumpability time or thickening time corresponded to production of a consistency, measured in standardised BC units, of 100 BC; beyond this a cement slurry is no longer considered to be pumpable. The transition time corresponds to passage from a consistency of 30 BC to a consistency of 100 BC; in other words, the transition time is characteristic of the first cement setting phase.

TABLE 6

| | # | | | | | | |
|---|---|---|---|---|---|---|---|
| | 1 | 2 | 3 | 4 | 5 | 6 | 7 |
| Free water (ml/250 ml) | 0.5 | 0 | 0 | 0 | 1 | | 0 |
| Pumpability time (hrs:min) | 3:00 | 5:09 | 4:20 | 4:54 | 4:52 | 5:05 | 4:54 |
| Transition time | 0:10 | 0:15 | 0:10 | 0:15 | 0:14 | 0:12 | 0:02 |
| Setting time for a compressive strength of | | | | | | | |
| 50 psi [0.34 MPa] | 3:50 | 6:02 | 6:00 | 6:06 | 8:37 | | 4:40 |
| 500 psi [3.44 MPa] | 4:38 | 6:55 | 6:52 | 7:06 | 9:47 | | 5:53 |
| Compressive strength at 24 h psi (MPa) | 5028 (34.7) | 2420 (16.7) | 2560 (17.7) | 2083 (15.7) | 3283 (22.6) | | 2100 (14.5) |

The formulations tested were perfectly stable and no tendency to sedimentation was observed, as shown by the free water volumes.

After setting for 24 hours, the compressive strength of the cements of the invention was much lower than that of a class G Portland cement but the level remained correct, while in practice, the compressive strength development was far from being complete at that time. From this viewpoint, comparing tests #2 and #5 is highly significant as the two samples differed only in the type of silica used: with a more reactive micro-silica, development was more rapid but in the first hours, the compressive strength after 24 hours was substantially lower.

High Temperature-high Pressure Cement Setting

For these tests, the cement was introduced in the form of a slurry into gold tubes 5 cm long and 0.32 cm in diameter, sealed at the end by an electric arc. The tubes were then placed for 10 days in autoclaves mounted on a 200 MPa pressure line where the pressure was regulated to ±1% and the temperature to ±1° C. The temperature was raised over 20 minutes and cooling was carried out with compressed air over 15 minutes.

A mineralogical analysis carried out by X ray diffraction produced the following results:

TABLE 7

| | Temperature | | | | | | | | | | | | | | | | |
|---|---|---|---|---|---|---|---|---|---|---|---|---|---|---|---|---|---|
| | 250° C. | | | | | | 300° C. | | | | | | 350° C. | | | | |
| | | | | | | | Pressure (MPa) | | | | | | | | | | |
| | 30 | | 60 | | 100 | | 30 | | 60 | | 100 | | 30 | | 60 | | 100 |
| | | | | | | | # | | | | | | | | | | |
| | 2 | 3 | 2 | 3 | 2 | 3 | 3 | 2 | 3 | 2 | 3 | 2 | 3 | 2 | 3 | 2 | 3 |
| Quartz | + | + | + | * | + | + | + | ++ | + | + | + | – | – | – | – | – | – |
| Corundum | ++ | ++ | ++ | ++ | ++ | ++ | ++ | ++ | ++ | ++ | ++ | – | – | – | – | – | – |
| Anhydrite | + | + | + | + | + | + | + | – | * | + | – | – | – | – | – | – | – |
| Xonotlite | ++ | + | + | ++ | ++ | + | + | ++ | + | ++ | ++ | + | + | + | + | * | + |
| Tobermorite | + | + | + | – | + | – | – | + | – | + | + | – | – | – | – | – | – |
| Anorthite | – | – | – | * | – | + | * | – | + | – | – | ++ | ++ | ++ | ++ | ++ | ++ |
| Epidote I | * | * | * | * | * | * | * | * | * | * | * | + | – | * | * | – | + |
| Prehnite | – | * | * | – | * | * | * | * | * | – | * | * | – | * | – | – | – |
| Garnet | * | * | * | * | * | * | * | – | * | * | * | * | * | * | * | * | + |
| Amorphous | ++ | ++ | ++ | ++ | ++ | ++ | ++ | + | + | ++ | ++ | + | + | + | + | + | + |

The following symbols are used in Table 7 and in the other tables below reporting mineralogical analyses,:
++: represents a large quantity;
+: represents a small quantity;
*: trace;
–: absence It should be noted that the X ray peaks corresponding to traces of epidote I, garnet and prehnite were very low in intensity or partially superimposed on those of other minerals so that identification of these compounds was uncertain. The large quantities of quartz and corundum observed for the samples at 250° C. and 300° C. show that the systems have not completely reacted after 10 days. In contrast, these relic minerals disappeared at 350° C. The anhydrite disappeared and the quantity of amorphous material reduced with an increase in temperature.

Formulation 3 tended to equilibrium between xonotlite and anorthite; it was close to this junction, as can be seen in FIG. 1. Formulation 2 contained other minerals (FIG. 1). Microprobe analysis showed the presence of prehnite ($Si_3Al_2Ca_2$), an epidote with composition $Si_{1.4}Al_{1.6}Ca$ and a garnet with composition $Si_{3.4}Al_2Ca_3$.

Prolonged High Temperature-high Pressure Setting of Cements

A cement slurry was prepared, placed in a reactor and heated for 3 days at 120° C. and 20 MPa. The fourth day, the temperature was raised to 290° C. over 6 hours to prevent cracking by thermal shock. The cement slurries were kept under these conditions for two months. Mineralogical analysis by X ray diffraction is shown in Table 8:

TABLE 8

| | Formulation | | | |
|---|---|---|---|---|
| | 1 | 2 | 3 | 7 |
| Corundum | – | ++ | + | – |
| Quartz | – | + | * | – |
| Xonotlite | ++ | + | + | * |
| Anorthite | – | ++ | ++ | + |
| Prehnite | – | + | * | – |

TABLE 8-continued

| | Formulation | | | |
|---|---|---|---|---|
| | 1 | 2 | 3 | 7 |
| Epidote 2 | – | * | * | – |
| Wairakite | – | – | – | + |

After two months at 290° C., the cements of formulations 2 and 3 had not completely reacted as demonstrated by the residual presence of quartz and corundum. However, this duration was sufficient to enable the cement to continue setting by encouraging anorthite crystallisation. Garnet could not be detected in any analysis. Mineralogical equilibrium of formulations 2 and 3 was reached by three minerals: anorthite, epidote and prehnite. That of formulation 7 was reached by anorthite and wairakite according to its position in the Si/Al/Ca phase triangle.

Formulation 2 falls well within the phase triangle by favouring prehnite and epidote to the detriment of xonotlite. Formulation 3 encourages the anorthite-xonotlite equilibrium in accordance with its position on the mineralogical junction.

Transformation of Cement in the Presence of Brine

The sample pieces obtained above underwent attack by a chlorinated brine C constituted by an aqueous solution of chlorine salts in the following proportions: NaCl: 199.7 g/l; $MgCl_2$, $6H_2O$: 1.14 g/l; $CaCl_2$: 63.0 g/l and KCl: 22.9 g/l.

The mineralogical phases found are shown in Table 9.

TABLE 9

| | Formulation | | | | | |
|---|---|---|---|---|---|---|
| | #2 | | | #3 | | |
| Conditions | Set 10 days | Set 2 months | Brine 7 days | Set 10 days | Set 2 months | Brine 7 days |
| Quartz | + | + | – | + | * | – |
| Corundum | ++ | ++ | – | ++ | + | – |
| Xonotlite | >> | + | + | + | + | + |
| Anorthite | – | ++ | ++ | – | ++ | ++ |
| Epidote 1-2 | * | * | * | * | * | * |
| Prehnite | – | + | + | * | * | * |
| Garnet | * | – | * | * | – | * |

This produces an evolution of the mineralogical repertoire of the cement over time and as a function of the external conditions (pressure, temperature, and brine).

Attack of brine on the cement set under controlled conditions for two months causes complete reaction, as shown by the disappearance of the quartz and corundum.

Formulation 3 tends towards an anorthite-xonotlite mineralogical equilibrium. Formulation 2 developed more epidote, garnet and especially prehnite phases.

Cement Setting in the Presence of Brine.

Cement setting tests were carried out using the same protocol as that described above but partially filling the gold tube with chlorinated brine C or a sulphated brine S, a saturated aqueous solution of sodium sulphate $Na_2SO_4$. Because of the small volume of slurry in each tube, this was equivalent to using brine as mixing water.

The mineralogical composition of the cements obtained from formulation #2 after 10 days in the autoclave is given in the table below:

TABLE 10

| | Temperature | | | | | | | | | | | |
|---|---|---|---|---|---|---|---|---|---|---|---|---|
| | 250° C. | | | 300° C. | | | | | 350° C. | | | |
| | Pressure (MPa) | | | | | | | | | | | |
| | 16 | | 30 | | 16 | | 30 | | | 30 | | | |
| | Brine | | | | | | | | | | | |
| | C | S | — | C | S | C | S | C | S | — | C | S |
| Quartz | + | * | | + | ++ | – | – | – | * | | – | – | * | – |
| Corundum | ++ | * | | ++ | ++ | – | ++ | – | + | | – | + | – |
| Anhydrite | – | + | | + | – | + | – | – | – | + | | – | – | + |
| Xonotlite | ++ | – | | ++ | + | – | ++ | – | + | | + | * | – |
| Tobermorite | + | – | | + | ++ | – | – | – | – | | – | – | – |
| Anorthite | – | – | | – | – | + | – | ++ | – | ++ | ++ | – |
| Epidote I | – | – | | * | – | – | – | – | – | + | – | – |
| Analcime | * | – | | – | * | – | – | – | – | – | – | – |
| Prehnite | * | * | | – | * | * | – | * | * | * | * | * |
| Garnet | – | – | | * | – | – | – | * | * | * | * | * |
| Felspathhoid | – | ++ | | – | – | ++ | – | ++ | – | ++ | – | – | ++ |
| Amorphous | ++ | ++ | | ++ | ++ | + | ++ | ++ | ++ | ++ | + | + | + |

Setting of slurry in the presence of brine shows an adaptation of the cement to briny media.

The sulphated brine allowed the cement to react better than the chlorinated brine.

It can be seen that the reactivity was higher in the presence of brine, corundum and quartz disappearing earlier under identical pressure and temperature conditions. The new-formed phases were of the same nature as those obtained by chemical modification due to attack on the set cement by brine. When the brine penetrates into the set cement under pressure, the cement retains its correct mineralogical repertoire but ion exchanges occur between the brine and the minerals being formed. In contrast, when the brine is present at the time the slurry sets, it modifies the chemical composition of the cement before it sets. A stable system is thus formed from the start which is an indication of good behaviour.

Brines modify the chemical composition of cement formulations.

These first qualitative results were verified for formulation #1 of the prior art and for formulations #2 and #5. For these tests, maturing of a slurry prepared with water or a brine as the mixing water were compared, as indicated in the table below. The compressive strength (in MPa) was measured after one month of setting at 287.7° C. (550° F.), except for the second column of results, entitled "water+ attack brine C", where the samples, prepared with water as the mixing water, were placed in the setting cell for one month before placing them in the presence of brine C for one additional month.

The column entitled "Brine C 2 months" corresponds to a sample prepared with brine C as mixing water that is placed in the setting cell for one month before placing them in the presence of brine c for one further month.

The brines used were chlorinated brine C, sulphated brine S and a mixed brine M, constituted by an aqueous solution and salts in the following proportions: $Na_2SO_4$: 199.7 g/l; NaCl: 1.14 g/l; $MgCl_2$, $6H_2O$: 63 g/l and KCl: 22.9 g/l.

| Mixing water | Water | Water + attack brine C | Brine C 1 month | Brine C 2 months | Brine S | Brine M |
|---|---|---|---|---|---|---|
| #1 | 43.8 | 37.3 | 24.4 | 19.6 | 23.7 | |
| #5 | 70.8 | 8.7 | 5.2 | | 8.8 | 10.1 |
| #2 | 15.2 | 15.8 | 11.0 | 10 | 11.6 | 10.7 |

It can be seen that the conventional formulation set in the presence of brine used directly as the mixing water had a compressive strength of only about 60% of the compressive strength of the samples prepared with tap water and which had not suffered brine attack. Further, mineralogical analysis showed the presence of xonotlite and foshagite (attack by a chlorinated brine) or kilkoanite (attack by a sulphated brine), which are known to be unfavourable to the development of compressive strength. After a further one month of attack be brine, the compressive strength is not more than 44% of the compressive strength of samples prepared with tap water that has not been subjected to attack by brine.

In the case of the preferred formulation #2 of the invention, degradation is much lower but in particular, mineralogical analysis showed a large anorthite presence, a phase which is known to be stable: in other words, it appears that the majority of the maturing due to attack by brines is achieved after one month while this is only accelerated with the conventional type formulation.

What is claimed is:

1. A cementing composition for an oil well, based on a Portland cement, silica and alumina, characterized in that the mineralogical composition of the cement matrix is included in one of the margarite-haüyne-[epidote/pumpellyite], haüyne-prehnite-[epidote/pumpellyite] and haüyne-prehnite-pectolite composition triangles, when plotting the CaO, $SiO_2$ and $Al_2O_3$ weight percentage in the Si—Ca—Al triangle of FIG. 1.

2. The composition of claim 1 whereby all or a portion of the silica is added in the form of a micro-silica.

3. The composition of claim 1 whereby all or a portion of the alumina is added in the form of micro-alumina.

4. The composition of claim 1 whereby the mixing water comprises salts that are the same as those present in the brines to which the cement will be exposed.

5. The composition of claim 4 whereby a sulphated brine is used to prepare the cement slurry.

6. The composition of claim 4 whereby a chlorinated brine is used to prepare the cement slurry.

7. The composition of claim 6 in which the mineralogical composition is further included within the Si—Ca—Al triangle in the zone delimited by Si between 35% and 45%, Al between 28% and 38% and Ca between 25% and 30%.

8. The composition of claim 7 whereby all or a portion of the silica is added in the form of a micro-silica.

9. The composition of claim 7 whereby all or a portion of the alumina is added in the form of micro-alumina.

10. The composition of claim 7 whereby the mixing water comprises salts that are the same as those present in the brines to which the cement will be exposed.

11. The composition of claim 10 whereby a sulphated brine is used to prepare the cement slurry.

12. The composition of claim 10 whereby a chlorinated brine is used to prepare the cement slurry.

13. The composition of claim 1, in which the mineralogical composition is further included within the Si—Ca—Al triangle in the zone delimited by Si between 35% and 50%, Al between 20% and 38% and Ca between 25% and 35%.

* * * * *